United States Patent
Ryshtun

(10) Patent No.: US 8,982,090 B2
(45) Date of Patent: Mar. 17, 2015

(54) OPTICAL STYLUS SYNCHRONIZATION

(75) Inventor: Andriy Ryshtun, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 126 days.

(21) Appl. No.: 13/342,096

(22) Filed: Jan. 1, 2012

(65) Prior Publication Data

US 2013/0169582 A1 Jul. 4, 2013

(51) Int. Cl.
- G06F 3/045 (2006.01)
- G06F 3/041 (2006.01)
- G06F 3/044 (2006.01)
- G06F 3/0354 (2013.01)

(52) U.S. Cl.
CPC ............. *G06F 3/0416* (2013.01); *G06F 3/044* (2013.01); *G06F 3/0418* (2013.01); *G06F 3/03545* (2013.01)
USPC ........................................................ 345/174

(58) Field of Classification Search
USPC .................... 345/156–179; 178/18.01–20.04
See application file for complete search history.

(56) References Cited

U.S. PATENT DOCUMENTS

| | | | |
|---|---|---|---|
| 4,761,637 A | 8/1988 | Lucas et al. | |
| 5,007,085 A * | 4/1991 | Greanias et al. | 726/34 |
| 5,721,837 A * | 2/1998 | Kikinis et al. | 710/303 |
| 5,838,308 A * | 11/1998 | Knapp et al. | 345/173 |
| 6,002,387 A * | 12/1999 | Ronkka et al. | 345/157 |
| 6,133,906 A * | 10/2000 | Geaghan | 345/179 |
| 6,377,249 B1 * | 4/2002 | Mumford | 345/179 |
| 6,529,189 B1 | 3/2003 | Colgan et al. | |
| 7,852,318 B2 | 12/2010 | Altman | |
| 7,932,897 B2 | 4/2011 | Elias et al. | |
| 7,969,426 B2 | 6/2011 | Skillman et al. | |
| 8,022,943 B2 | 9/2011 | Silverbrook et al. | |
| 8,159,474 B2 * | 4/2012 | Hauck | 345/179 |
| 2003/0015650 A1 | 1/2003 | Clapper et al. | |
| 2008/0122803 A1 * | 5/2008 | Izadi et al. | 345/175 |
| 2008/0142281 A1 | 6/2008 | Geaghan | |
| 2008/0297487 A1 * | 12/2008 | Hotelling et al. | 345/173 |
| 2009/0146992 A1 | 6/2009 | Fukunaga et al. | |
| 2009/0219262 A1 | 9/2009 | Champion et al. | |
| 2009/0243995 A1 * | 10/2009 | Kimura | 345/102 |
| 2010/0155153 A1 | 6/2010 | Zachut | |
| 2010/0156965 A1 * | 6/2010 | Kim et al. | 345/691 |
| 2010/0194707 A1 | 8/2010 | Hotelling et al. | |
| 2010/0214254 A1 * | 8/2010 | Tsai | 345/174 |

(Continued)

FOREIGN PATENT DOCUMENTS

| | | |
|---|---|---|
| EP | 1274639 B1 | 11/2005 |
| WO | 2011124138 A1 | 10/2011 |

OTHER PUBLICATIONS

International Search Report for International Application No. PCT/US2012/52714 dated Nov. 6, 2012; 2 pages.

(Continued)

*Primary Examiner* — Kumar Patel
*Assistant Examiner* — Amy C Onyekaba

(57) ABSTRACT

Active stylus operation when there is no physical connection between the stylus and the touch array requires communication and synchronization. It is possible to use the touchscreen stack-up itself to communicate synchronization signals or other information optically by outfitting the active stylus with an optical receiver and transmitting signals either with additional diodes or by modulating the display clock itself.

20 Claims, 14 Drawing Sheets

(56) References Cited

U.S. PATENT DOCUMENTS

2010/0315384 A1* 12/2010 Hargreaves et al. .......... 345/179
2010/0321566 A1* 12/2010 Yamamoto et al. ........... 348/441
2011/0102349 A1* 5/2011 Harris ........................... 345/173
2011/0181549 A1* 7/2011 Hotelling et al. ............. 345/174
2012/0050231 A1* 3/2012 Westhues et al. ............. 345/179
2013/0106767 A1* 5/2013 Shahparnia et al. .......... 345/174

OTHER PUBLICATIONS

Written Opinion of the International Searching Authority for International Application No. PCT/US2012/52714 dated Nov. 6, 2012; 6 pages.

\* cited by examiner

US 8,982,090 B2

OPTICAL STYLUS SYNCHRONIZATION

TECHNICAL FIELD

This disclosure relates to the field of touch-sensors and, in particular, to stylus synchronization and operation with a touch-sensor array.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger or a stylus pen. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

A user may also use a stylus to interact with the screen and manipulate data. A stylus may have varying levels of complexity. Basic styli may consist a point by which to contact the surface of a resistive touchscreen. For capacitive systems, styli may have a conductive tip with which to change the capacitance of the sensing electrodes. The change in capacitance may be passive, with only the extra conductive material affecting the capacitance of the sense electrode. The change in capacitance may also be active, whereby a signal is transmitted from the tip of the stylus to the surface of the touchscreen or touch-sensor pad. This signal may be a constant voltage, or in other embodiments, it may be an alternative voltage which may be received by the capacitance sensing circuitry.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

An embodiment of a capacitive sensor array may include sensor elements arranged such that each unit cell corresponding to an intersection between sensor elements may include a main trace and one or more primary subtraces branching away from the main trace. In one embodiment, a sensor element may also include one or more secondary subtraces branching from a primary subtrace, or one or more tertiary subtraces branching from a secondary subtrace. In one embodiment, a sensor array having such a pattern may have decreased signal disparity and reduced manufacturability problems as compared to other patterns, such as a diamond pattern. Specifically, a capacitive sensor array with sensor elements having main traces and subtraces branching from the main trace, such as a totem pole pattern, may be manufactured with decreased cost and increased yield rate, as well as improved optical quality.

An embodiment of such a capacitive sensor array may include a first and a second plurality of sensor elements each intersecting each of the first plurality of sensor elements. Each intersection between one of the first plurality of sensor elements and one of the second plurality of sensor elements may be associated with a corresponding unit cell. A unit cell may be a single node or pixel of capacitance measurement on the capacitive sensor array. In one embodiment, a unit cell corresponding to an intersection may be understood as an area including all locations on the surface of the sensor array that are nearer to the corresponding intersection than to any other intersection between sensor elements.

In one embodiment of a capacitive sensor array, each of the second plurality of sensor elements includes a main trace that crosses at least one of the plurality of unit cells, and further includes, within each unit cell, a primary subtrace that branches away from the main trace. In one embodiment, the primary subtrace may be one of two or more primary subtraces branching symmetrically from opposite sides of the main trace, resembling a "totem pole". Alternatively, the primary subtraces may branch asymmetrically from the main trace.

Figure 1:
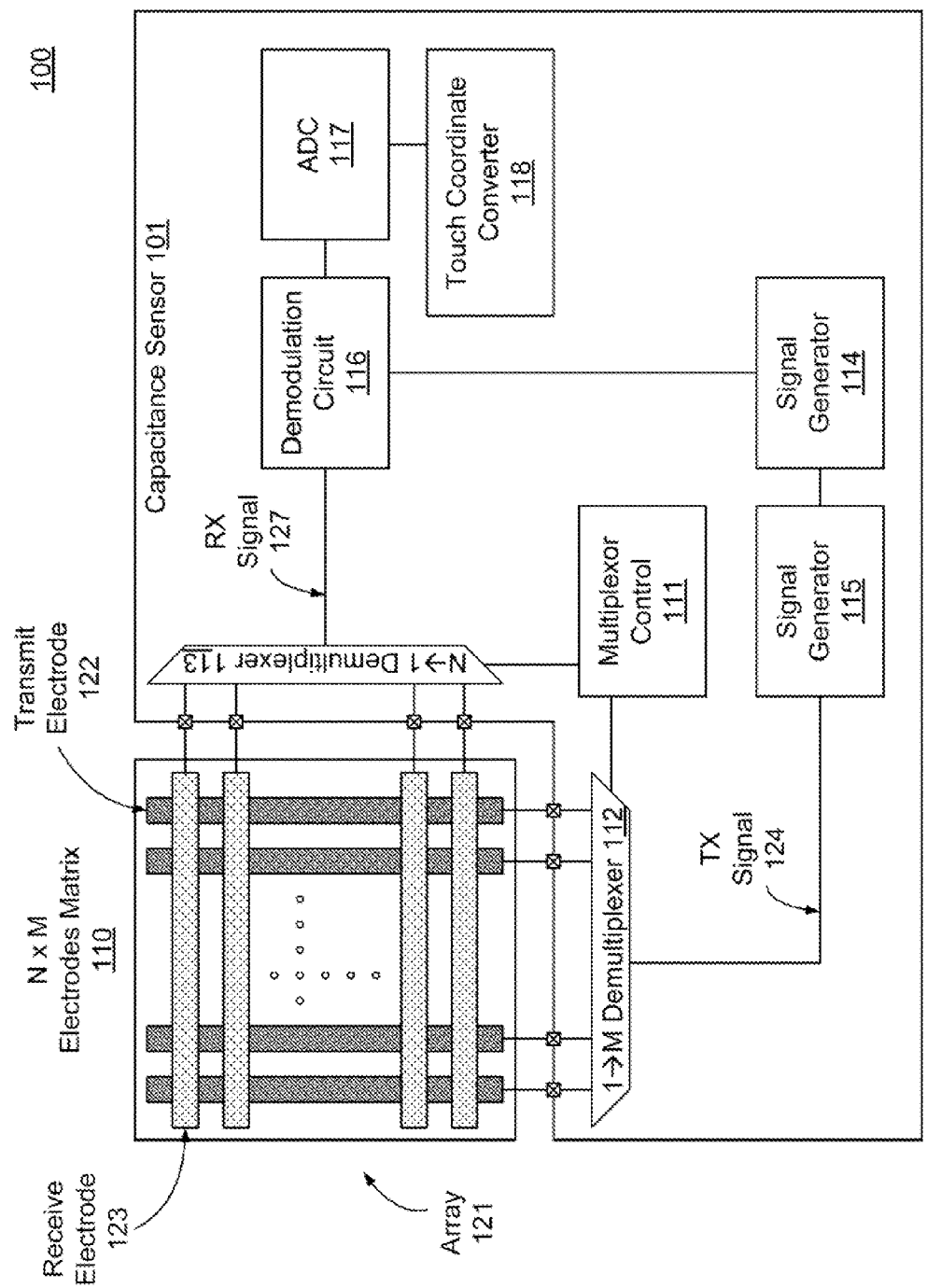
FIG. 1 is a block diagram illustrating an embodiment of an electronic system that processes touch sensor data.

FIG. 1 is a block diagram illustrating one embodiment of a capacitive touch sensor array 121 and a capacitance sensor 101 that converts measured capacitances to coordinates. The coordinates are calculated based on measured capacitances. In one embodiment, touch sensor array 121 and capacitance sensor 101 are implemented in a system such as electronic system 100. Touch sensor array 121 includes a matrix 110 of N×M electrodes (N receive electrodes and M transmit electrodes), which further includes transmit (TX) electrode 122 and receive (RX) electrode 123. Each of the electrodes in matrix 110 may be connected with capacitance sensor 101 through demultiplexer 112 and multiplexer 113.

Capacitance sensor 101 may include multiplexer control 111, demultiplexer 112 and multiplexer 113, clock generator 114, signal generator 115, demodulation circuit 116, and analog-to-digital converter (ADC) 117. ADC 117 is further coupled with touch coordinate converter 118. Touch coordinate converter 118 outputs a signal to the processing logic 102.

The transmit and receive electrodes in the electrode matrix 110 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 122 is capacitively coupled with receive electrode 123 at the point where transmit electrode 122 and receive electrode 123 overlap.

Clock generator 114 supplies a clock signal to signal generator 115, which produces a TX signal 124 to be supplied to the transmit electrodes of touch sensor array 121. In one embodiment, the signal generator 115 includes a set of switches that operate according to the clock signal from clock generator 114. The switches may generate a TX signal 124 by periodically connecting the output of signal generator 115 to a first voltage and then to a second voltage, wherein said first and second voltages are different.

The output of signal generator 115 is connected with demultiplexer 112, which allows the TX signal 124 to be applied to any of the M transmit electrodes of touch sensor array 121. In one embodiment, multiplexer control 111 controls demultiplexer 112 so that the TX signal 124 is applied to each transmit electrode 122 in a controlled sequence. Demultiplexer 112 may also be used to ground, float, or connect an alternate signal to the other transmit electrodes to which the TX signal 124 is not currently being applied.

Because of the capacitive coupling between the transmit and receive electrodes, the TX signal 124 applied to each transmit electrode induces a current within each of the receive electrodes. For instance, when the TX signal 124 is applied to transmit electrode 122 through demultiplexer 112, the TX signal 124 induces an RX signal 127 on the receive electrodes in matrix 110. The RX signal 127 on each of the receive electrodes can then be measured in sequence by using multiplexer 113 to connect each of the N receive electrodes to demodulation circuit 116 in sequence. In one embodiment, multiple multiplexers may allow RX signals to be received in parallel by multiple demodulation circuits.

The mutual capacitance associated with each intersection between a TX electrode and an RX electrode can be sensed by selecting every available combination of TX electrode and an RX electrode using demultiplexer 112 and multiplexer 113. To improve performance, multiplexer 113 may also be segmented to allow more than one of the receive electrodes in matrix 110 to be routed to additional demodulation circuits 116. In an optimized configuration, wherein there is a 1-to-1 correspondence of instances of demodulation circuit 116 with receive electrodes, multiplexer 113 may not be present in the system.

When an object, such as a finger or stylus, approaches the electrode matrix 110, the object causes a decrease in the mutual capacitance between only some of the electrodes. For example, if a finger or stylus is placed near the intersection of transmit electrode 122 and receive electrode 123, the presence of the finger will decrease the mutual capacitance between electrodes 122 and 123. Thus, the location of the finger on the touchpad can be determined by identifying the one or more receive electrodes having a decreased mutual capacitance in addition to identifying the transmit electrode to which the TX signal 124 was applied at the time the decreased mutual capacitance was measured on the one or more receive electrodes.

By determining the mutual capacitances associated with each intersection of electrodes in the matrix 110, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal (RX signal 127) is rectified by demodulation circuit 116. The rectified current output by demodulation circuit 116 can then be filtered and converted to a digital code by ADC 117.

The digital code is converted to touch coordinates indicating a position of an input on touch sensor array 121 by touch coordinate converter 118. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, touch sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

Figure 2A:
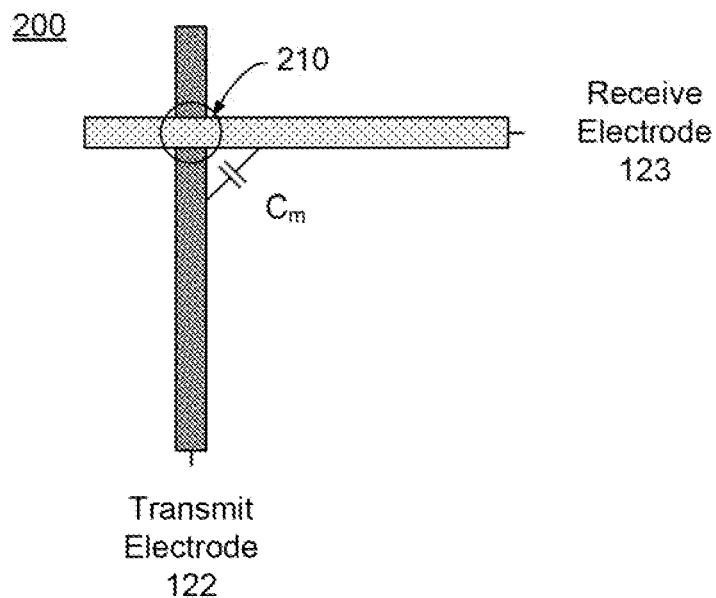
FIG. 2A illustrates an embodiment of a transmit and receive electrode in a mutual capacitance array.

FIG. 2A illustrates an embodiment of a simplified representation 200 of an embodiment of a single intersection, or node 210, of a transmit electrode 122 and a receive electrode 123. Transmit electrode 122 is coupled to 1→N demultiplexer 112 and receive electrode 123 is coupled to N→1 demultiplexer 113 as shown in FIG. 1. Node 210 is characterized by mutual capacitance, Cm, between transmit electrode 122 and receive electrode 123. A mutual capacitance, Cm, exists for every intersection between every transmit electrode and every receive electrode in N×M electrode matrix 125 (shown in FIG. 1).

Figure 2B:
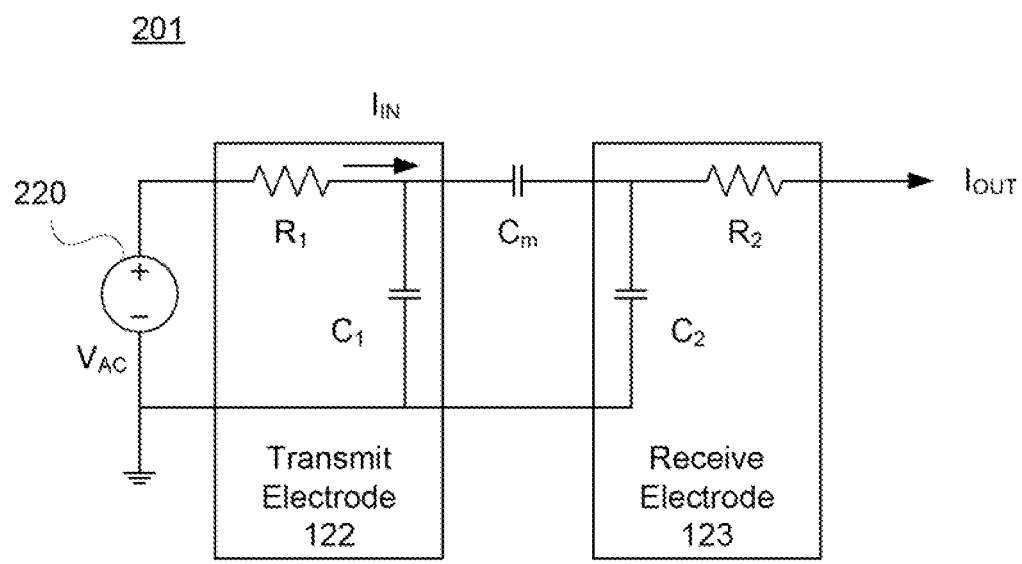
FIG. 2B illustrates a schematic representation of a transmit and receive electrode in a mutual capacitance array.

FIG. 2B illustrates a circuit representation 201 of a single intersection, or node 210, from FIG. 2A. Transmit electrode 122 comprises a resistance, R1, and a parasitic capacitance, C1. Receive electrode 123 comprises a resistance, R2, and a parasitic capacitance, C2. Resistances R1 and R2 are a function of the impedance of transmit electrode 122 and receive electrode 123, respectively. High impedance materials, such as indium tin oxide, limit the rate of charge and discharge on transmit and receive electrodes. Capacitors C1 and C2 represent the parasitic capacitance each electrode has to the rest of the array and the rest of the system for each transmit electrode 122 and each receive electrode 123, respectively. Parasitic capacitances C1 and C2 are the capacitance of each electrode to everything in the system except the transmit or receive electrode that comprises the other side of node 210. Voltage source 220 provides may provide an alternating voltage source (signal) on transmit electrode 122, thus generating a current, Iin, through resistor R1, and building a voltage potential on mutual capacitor Cm. This voltage potential is then converted to a current, Tout, through resistor R2. Current Tout is representative of the mutual capacitance, Cm, between transmit electrode 122 and receive electrode 123.

Figure 3:
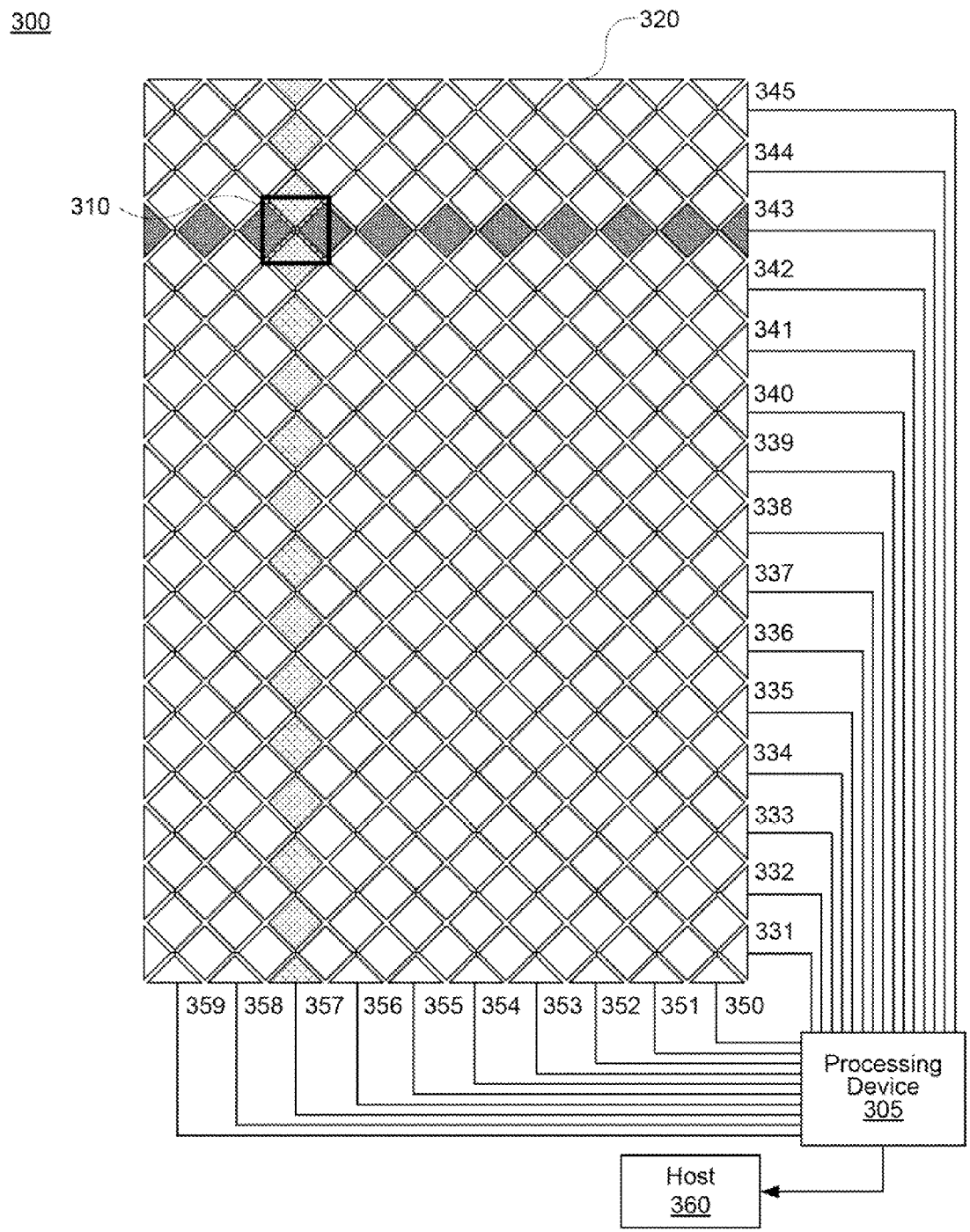
FIG. 3 illustrates an embodiment of a capacitive sensor array having a diamond pattern.

FIG. 3 illustrates an embodiment of a capacitive touch sensing system 300 that includes a capacitive sensor array 320. Capacitive sensor array 320 includes a plurality of row sensor elements 331-345 and a plurality of column sensor elements 350-359. The row and column sensor elements 331-445 and 350-359 are connected to a processing device 305, which may include the functionality of capacitance sensor 101 of FIG. 1. In one embodiment, the processing device 305 may perform TX-RX scans of the capacitive sensor array 320 to measure a mutual capacitance value associated with each of the intersections, or nodes, 310, between a row sensor element and a column sensor element in the sensor array 320. The measured capacitances may be further processed to determine centroid, or center of mass, locations of one or more contacts at the capacitive sensor array 320.

In one embodiment, the processing device 305 is connected to a host 360 which may receive the measured capacitances or calculated centroid locations from the processing device 305.

The capacitive sensor array 320 illustrated in FIG. 3 may include sensor elements arranged in a diamond pattern. Specifically, the sensor elements 331-348 of capacitive sensor array 320 may be arranged in a single solid diamond (SSD) pattern as shown in FIG. 3A. In other embodiments, the sensors elements 331-345 and 350-359 may be hollow diamonds ("single hollow diamonds") or may be pairs of diamonds coupled at one or both ends ("dual solid diamonds"). In another embodiment, pairs of hollow diamonds may be coupled at one or both ends ("dual hollow diamonds").

Figure 4:
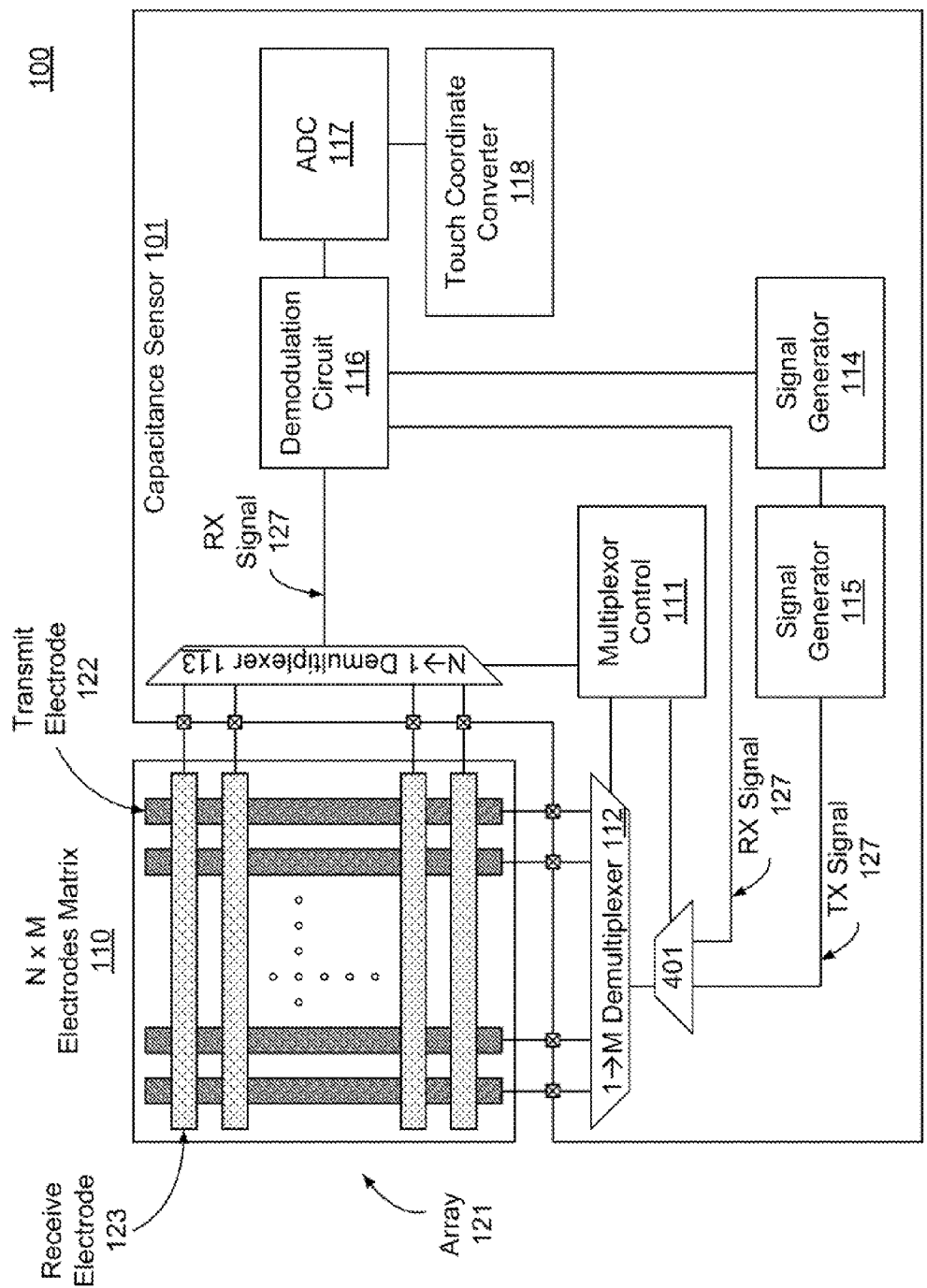
FIG. 4 is a block diagram illustrating an embodiment of an electronic system that processes touch sensor data and is configured to receive on all electrodes.

FIG. 4 is a block diagram of an embodiment 400 of touch sensor array 121 and capacitance sensor 101. The embodiment 400 is similar to the electronic system 100 of FIG. 1, however transmit electrodes 122 may be coupled to the demodulation circuit 116 through demultiplexer 112, multiplexer 401. In this embodiment, all of the electrodes are configured to receive RX signal 127. Multiplexer 401 may be controlled by multiplexer control 111 and enables the capacitance sensor 101 to function as a transmit-and-receive sensor in one configuration and a receive-only sensor in another configuration. A receive-only sensor may require an external signal. This external signal may be provided by an active stylus 401, which may be configured to provide a signal which is attenuated to the expected RX single 127.

The measured mutual capacitance of embodiment 400 when all the electrodes are configured to receive is between the tip of a stylus and the receive electrodes. Because of the capacitive coupling between the stylus tip and receive electrodes, the TX signal 124 applied to each transmit electrode induces a current within each of the receive electrodes. For instance, when the TX signal 124 is applied to transmit electrode 122 through demultiplexer 112, the TX signal 124 induces an RX signal 127 on the electrodes in matrix 110. The RX signal 127 on each of the electrodes can then be measured in sequence by using demultiplexer 112 and multiplexer 113 to connect each of the N receive electrodes to demodulation circuit 116 in sequence.

The mutual capacitance associated with each intersection between stylus 401 and an RX electrode can be sensed by selecting every available RX electrode using demultiplexer 112 and multiplexer 113. To improve performance, multiplexer 113 may also be segmented to allow more than one of the receive electrodes in matrix 110 to be routed to additional demodulation circuits 116. In an optimized configuration, wherein there is a 1-to-1 correspondence of instances of demodulation circuit 116 with electrodes, multiplexers 112 and 113 may not be present in the system.

Figure 5:
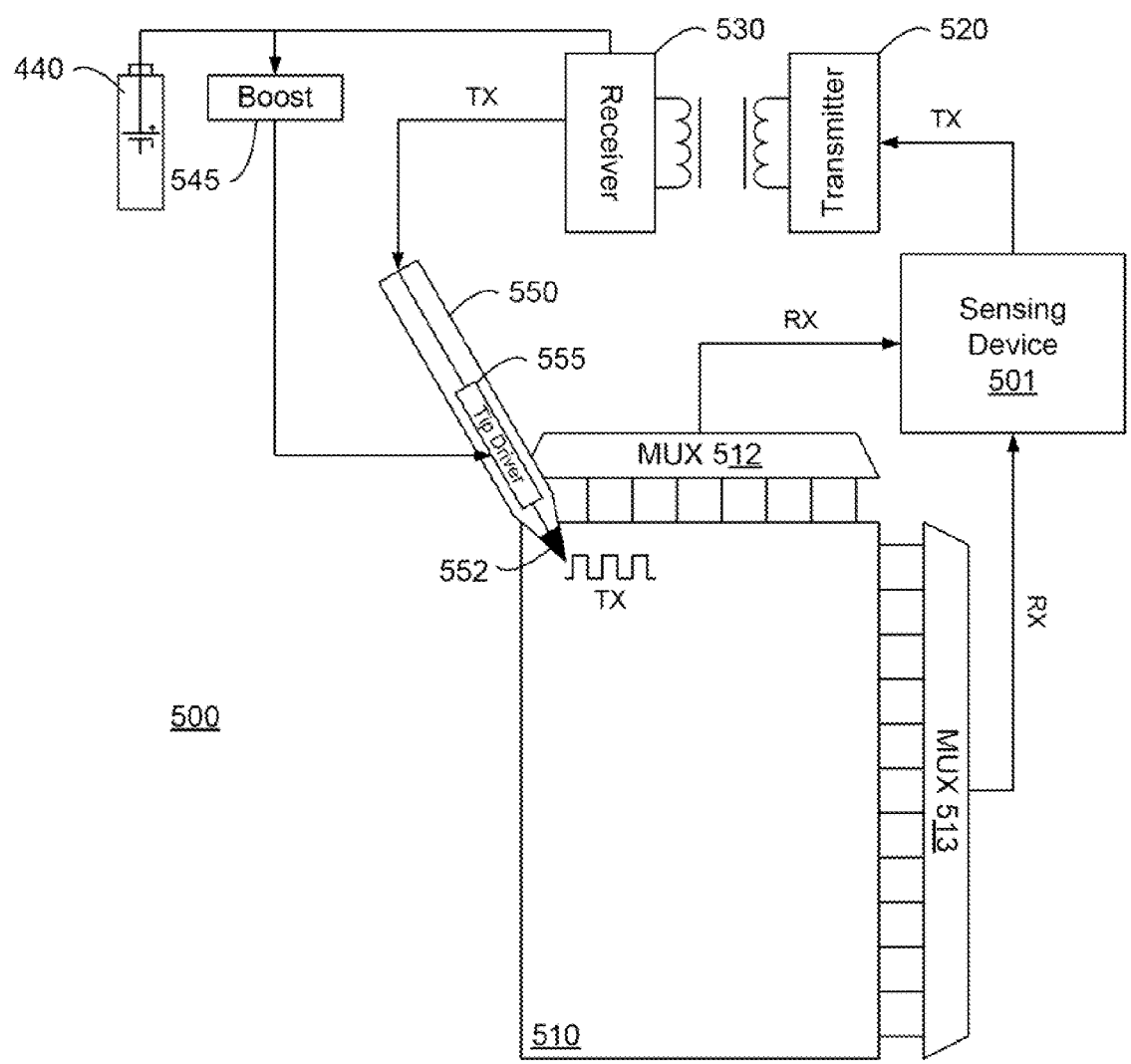
FIG. 5 illustrates an embodiment of a synchronized stylus with a touchscreen comprising an inductive synchronization.

FIG. 5 illustrates an embodiment 500 of capacitive sensing array 510, sensing device, and stylus 550. Capacitive sensing array 510 may be analogous to matrix 110 of FIGS. 1 and 4 and is coupled to sensing device 501 through multiplexers 512 and 513. RX signal 127 may be received the electrodes (122 and 123 of FIGS. 1 and 4) and routed to the demodulation circuit (116 of FIGS. 1 and 4). Sensing device 501 may be coupled to transmitter 520. Sensing device 501 may pass TX signal 124 to transmitter 520 so that transmitter 520 may transmit the TX signal to receiver 530. Receiver 530 may be coupled to tip driver 555 which is part of stylus 550. In one embodiment, receiver 530 may be integrated into stylus 550. TX signal 124 may be driven out the stylus tip 552 to capacitance sensing array 510, where it may be received by the electrodes and passed to sensing device 501 as RX signal 127 through multiplexers 512 and 513. In one embodiment, battery 540 boost circuit may be coupled to receiver 530 and tip driver 555.

Figure 6:
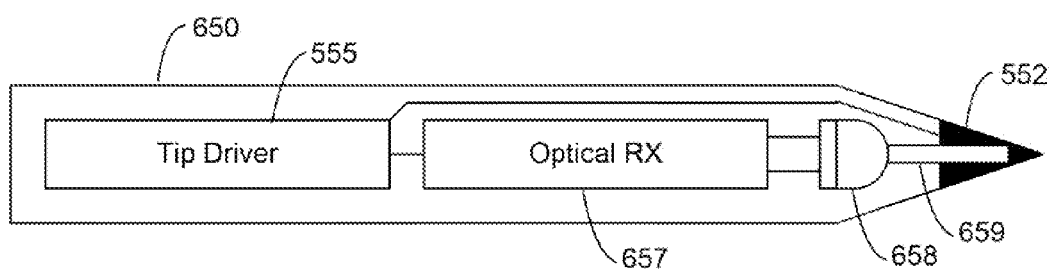
FIG. 6 illustrates am embodiment of an optical synchronization stylus.

FIG. 6 illustrates an embodiment of stylus 650 comprising a tip driver, and optical RX circuit, a photo diode 658, a light tube 659 and a stylus tip 552. Tip driver 555 and optical RX circuit 657 may be coupled to a power source and boost circuit (not shown). Light may enter stylus 650 through light tube 659 and be received by photodiode 658. The light received by photodiode may be converted to a drive signal by optical RX circuit 657 and sent to tip driver 555. Tip driver then takes the converted drive signal and transmit that signal through stylus tip 552. In one embodiment, the light entering light tube 659 may be in the infrared (IR) range such that it is not visible to a user. The IR light may contain a signal that can be received and demodulated by optical RX circuit 657.

Figure 7:
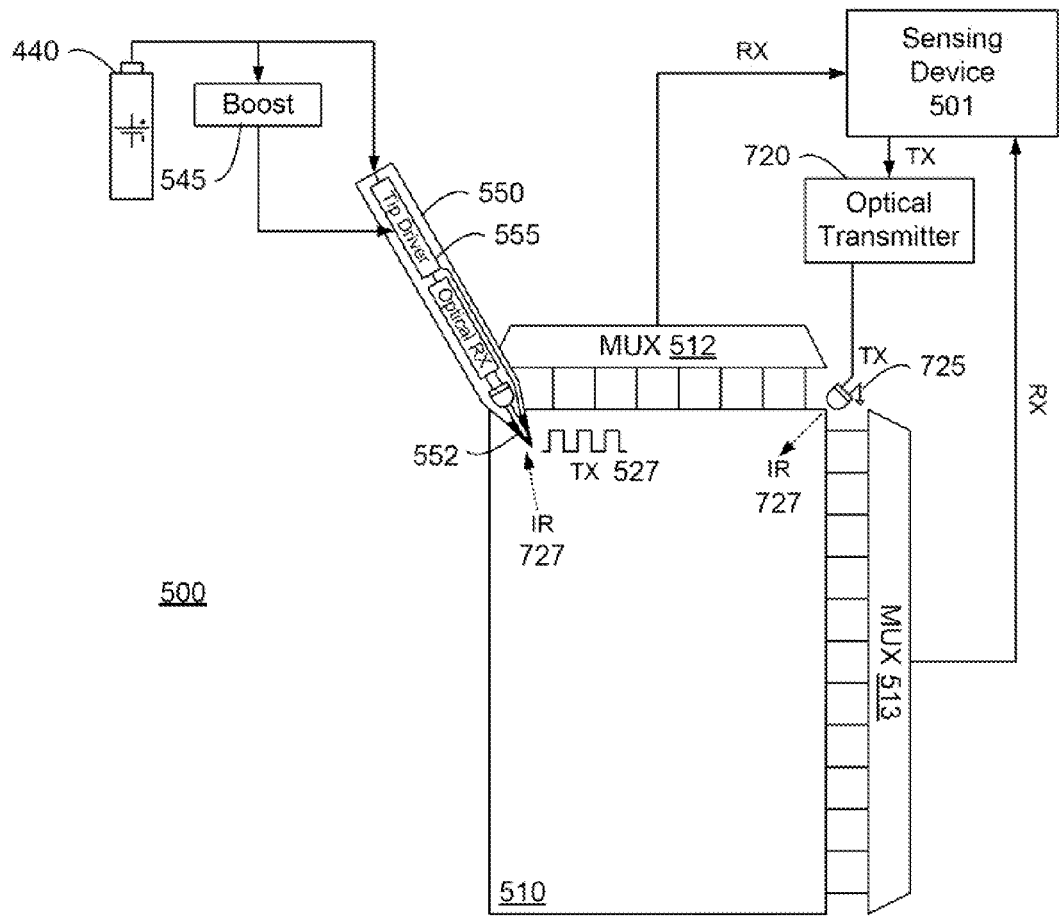
FIG. 7 illustrates an embodiment of a synchronized stylus with a touchscreen comprising an optical synchronization.

FIG. 7 illustrates an embodiment 700 of a capacitive sensing array 510, a sensing device 501, an optical transmitter 720 and a stylus 650. The operation of embodiment 700 is similar to that of embodiment 500 of FIG. 5, however the synchronization of sensing device 501 and the tip driver 555 is achieved through an optical signal and not inductive (through transmitter 520 and 530). Sensing device 501 may pass TX signal 124 to optical transmitter 720, which drives LED 725. IR signal 727 from LED 725 may then be received by the optical RX circuit (657 of FIG. 6) through the light tube and photodiode (659 and 658 of FIG. 6).

In one embodiment, optical transmitter may be configured to produce a plurality of IR signals. In this embodiment, multiple styli may be synchronized by the same optical synchronization circuit. Multiple styli may be configured to provide different TX signals which may be demodulated by sensing device 501 configured with corresponding clock dividers. In this embodiment, different users may be able to input on the display simultaneously and have their movements and inputs easily tracked. In another embodiment, different TX signals may correspond to different types of input by the same stylus or multiple styli, allowing for different interactions depending on received TX signal, if within a predefined range.

Figure 8:
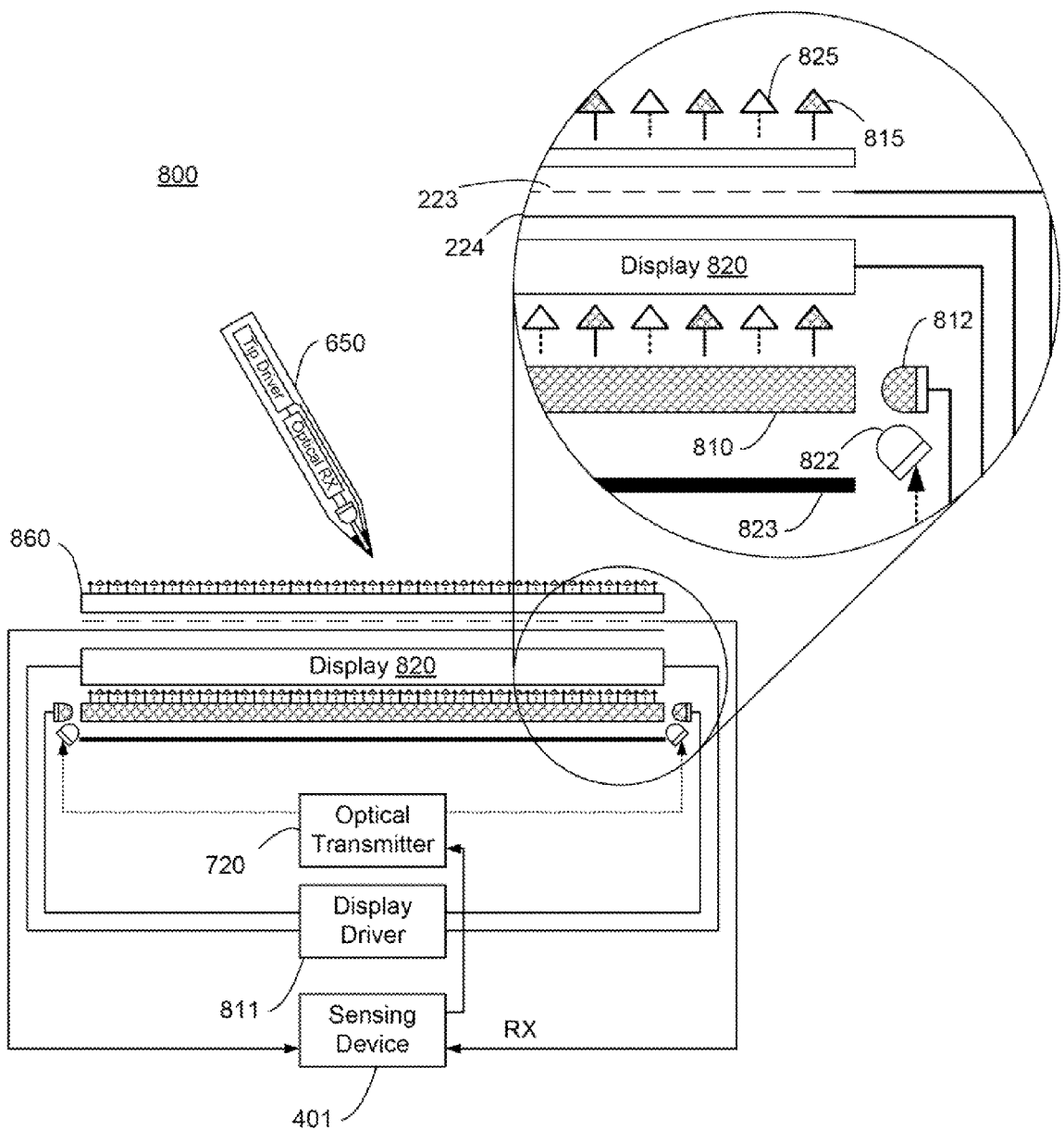
FIG. 8 illustrates an embodiment of an optically synchronized stylus in cross-section.

FIG. 8 illustrates an embodiment 800 of a capacitance sensing array stack-up. The sensing array may comprise several layers including a display 820 configured to display graphical information to a user. Display 820 may be a liquid crystal display, AMOLED display, OLED display, or vacuum fluorescence displays. Display 820 may be backlit by an LED 820, the light 815 of which may be channeled toward the user through light guide 810. Light guide 810 may channel the backlight from LED 812 and light that is not channeled up to the user may be reflected off mirror 815 to the user. Electrodes 223 and 224 from FIG. 2 may be disposed between the display 820 and an overlay 860. Overlay 860 may be a glass layer or a polyethylene teraphthalate (PET). Overlay 860 may be constructed of other transparent materials. Electrodes 223 and 224 may be deposited on overlay 860 or on display 820, or both. Electrodes 223 and 224 may also be deposited on a third substrate disposed between overlay 860 and display 820. In one embodiment, the layers of the stackup may be adhered to each other through an optically clear adhesive. The optically clear adhesive may be configured to have an index of refraction matching that of the electrode material, or any of the substrates.

Display driver 811 may be configured to control the graphical display on display 820 and to drive the backlight LED 812. In another embodiment, the LED backlight drive and the display drive may be on separate controllers.

Sensing device 401 may be configured to receive the RX signal 127 from electrodes 223 and 224. To synchronize the sensing device receive channel (demodulation circuit 116, FIG. 1), sensing device 401 may send TX signal 524 to optical transmitter 720. Optical transmitter may be configured to then drive IR LED 822 with TX signal 524. TX signal 524 may enter light guide 810 and be channeled through the stackup to stylus 650. As described with regard to FIGS. 6 and 7, stylus 650 may be configured to receive TX signal 527 optically and convert that signal to an electromagnetic signal that can be received on electrodes 223 and 224.

Figure 9A:
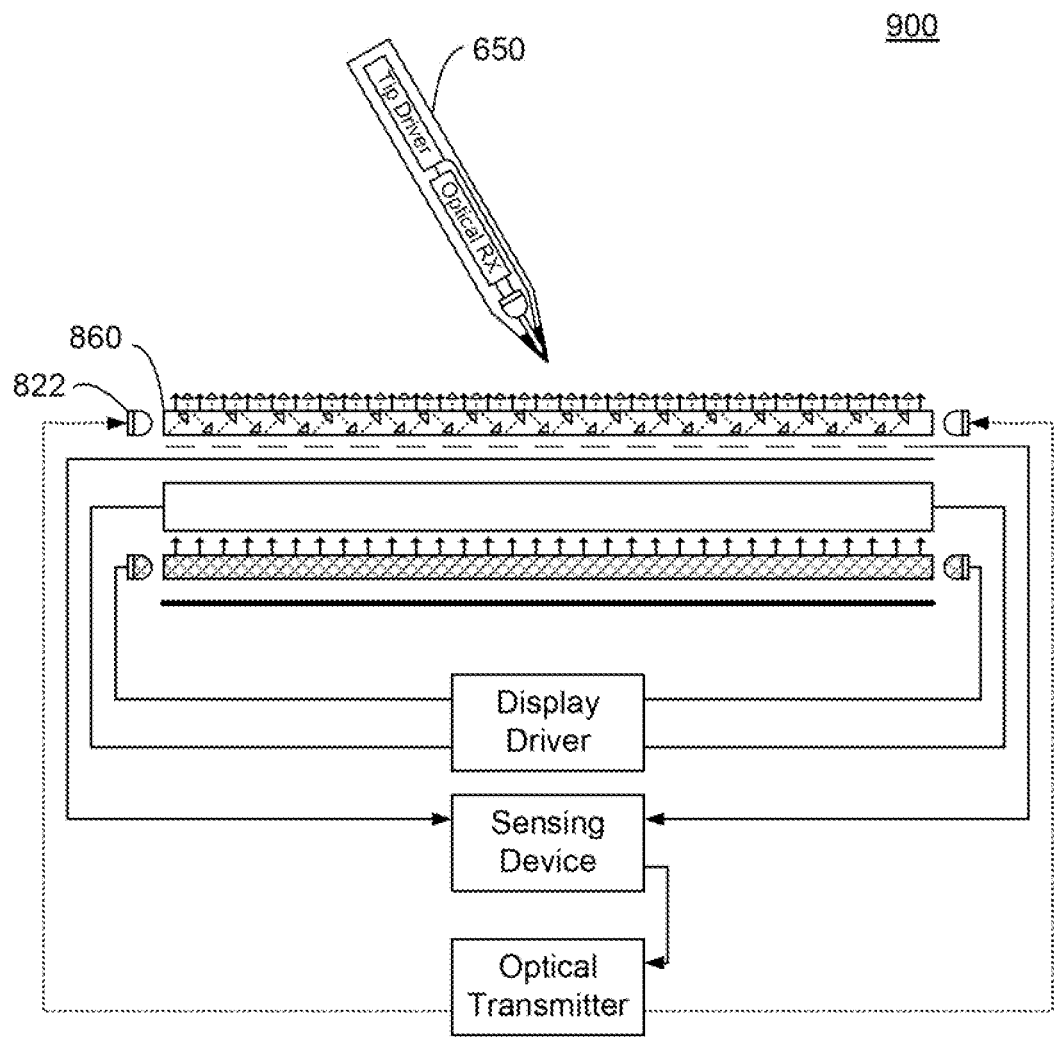
FIGS. 9A and B illustrate embodiments of an optically synchronized stylus in cross-section.

FIG. 9A illustrates an embodiment of stackup 900, wherein IR LED 822 passes light into overlay 860, rather than light guide 810. In one embodiment IR LEDs may be positioned on both sides of overlay 860. Light from IR LEDs 822 may travel through overlay 860 and be channeled up to stylus 650 by means of a polarizing treatment.

Figure 9B:
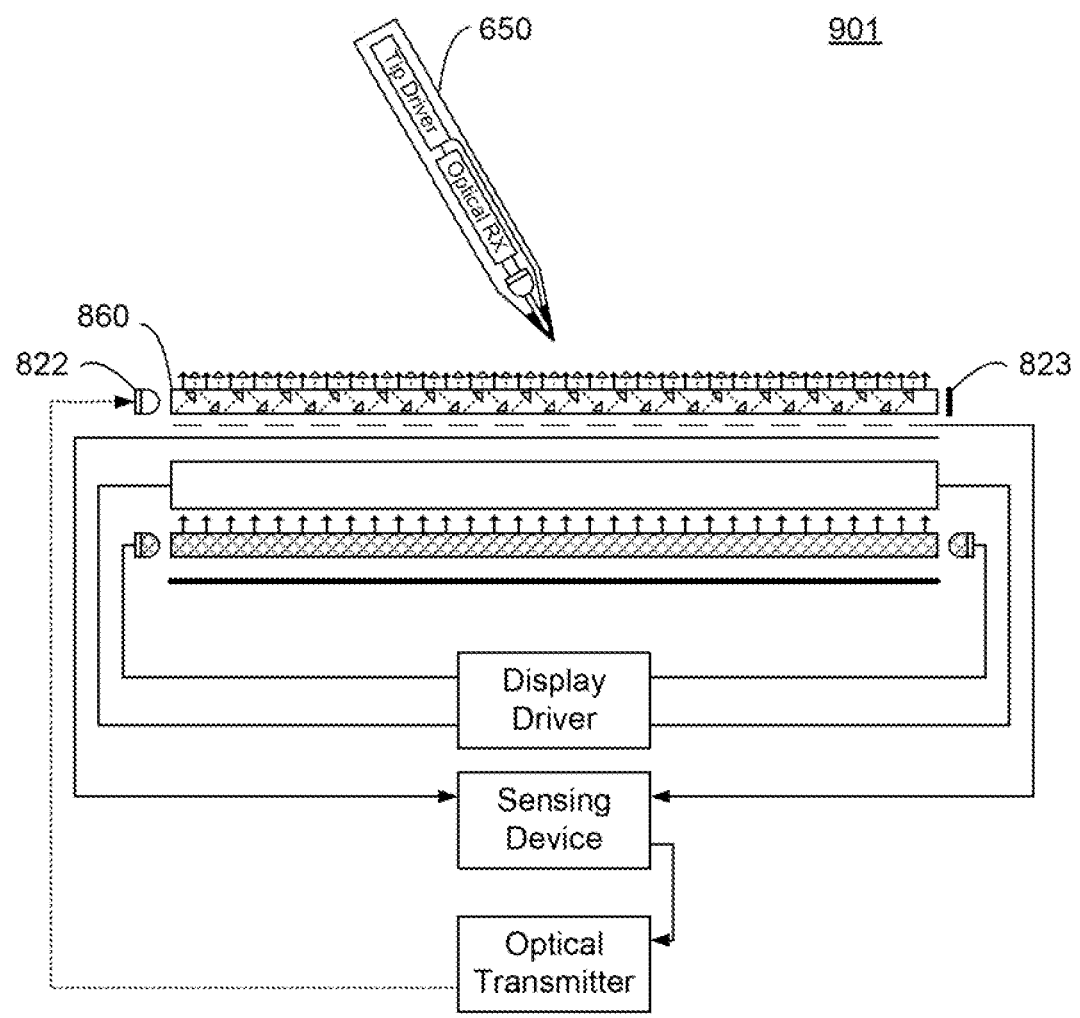

FIG. 9B illustrates an embodiment of stackup 901, wherein a signal IR LED is positioned on one side of overlay 860 and configured to pass light into that side of overlay 860. Light from IR LED 822 that is not channeled to stylus 650 may be reflected off mirror 823. Mirror 823 ensures that the light emitted from IR LED 822 is channeled to mirror 823 and does not exit overlay 860 without serving its purpose.

Figure 10:
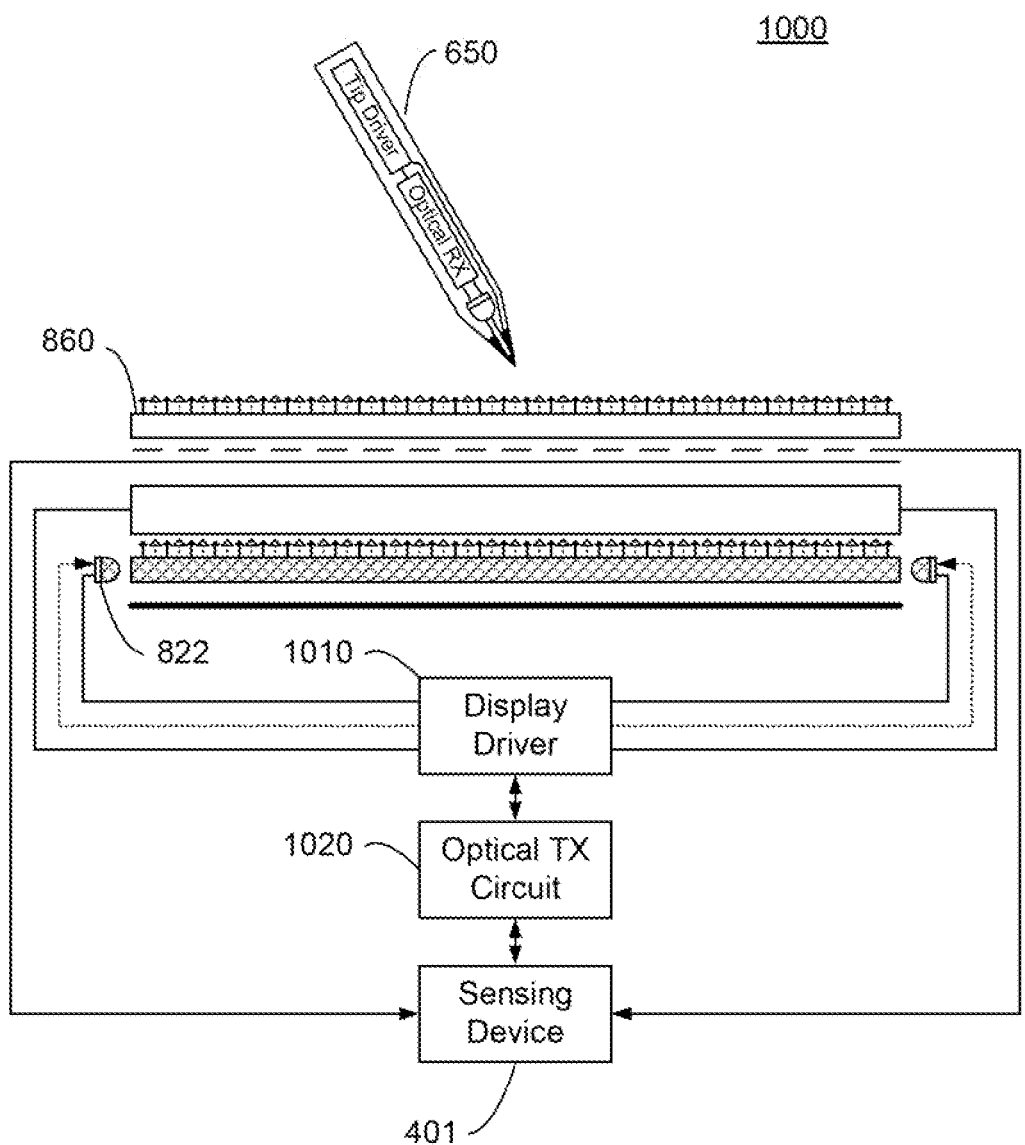
FIG. 10 illustrates embodiment of an optically synchronized stylus in cross-section.

FIG. 10 illustrates an embodiment of stackup 1000 wherein display driver 1010 is configured to drive both the backlight and the synchronization signal. In this embodiment, an optical TX circuit may be disposed between the sensing device 401 and display driver 1010. The optical TX circuit may be configured to receive a signal from sensing device 401 and to transmit the signal to an optical receiver through the display driver. In this embodiment, sensing device 401 may pass the synchronization signal to display driver. The synchronization signal my then be passed into the light guide through the same LED that is used for backlight control. In another embodiment, the display driver may be configured to drive separated LEDs for the LCD backlight and the synchronization IR LED. In another embodiment, the display driver may modulate the pixel clock per signals from the sensing device 401 and optical TX circuit 1020 to provide the optical signal to the receiver in stylus 650.

Figure 11A:
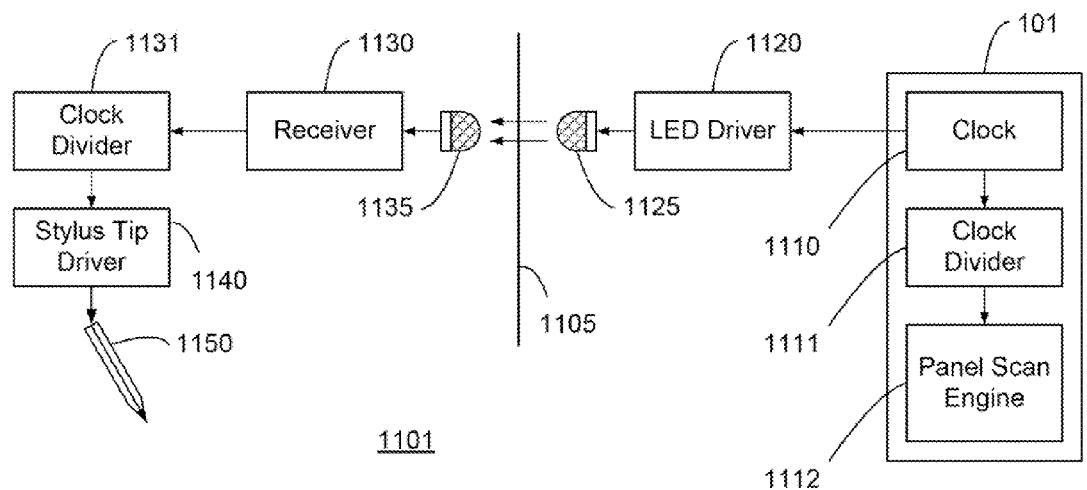
FIGS. 11A-D illustrate embodiments of synchronization transmitters and receivers.

FIGS. 11A-D illustrate alternative representations of the optical synchronization circuit shown in FIG. 7. FIG. 11A illustrates an embodiment 1101 comprising capacitance sensor 101 which may be coupled to LED driver 1120. LED driver 1120 may be constructed using inductance and switches. In this embodiment, a clock may be required for operation. LED driver 1120 may have an clock signal synchronization input which is coupled to capacitance sensor 101. The clock frequency for the synchronization of LED driver 1120 may be higher than the TX drive frequency to be passed to receiver 1130. The LED driver synchronization signal and the TX drive frequency may be derived from the same clock signal using a clock divider 1111 coupled between the clock 1110 and a panel scan engine 1112. The panel scan engine may comprise the capacitance sensing circuits described in FIGS. 1 and 4. LED driver 1120 may be coupled to IR LED 1125 and configured to transmit the touchscreen clock information to the stylus 1150 through the overlay 1105, which is analogous to overlay 860 from FIGS. 8, 9A, 9B and 10. Touchscreen clock information or synchronization information is received by photodiode 1135 and demodulated by receiver 1130. Clock divider 1131 may be coupled between receiver 1130 and stylus tip driver 1140. In one embodiment clock divider 1131 may have the same dividing coefficient as clock divider 1111, which may enable an efficient translation of the clock signal or synchronization signal from LED driver 1120.

Figure 11B:
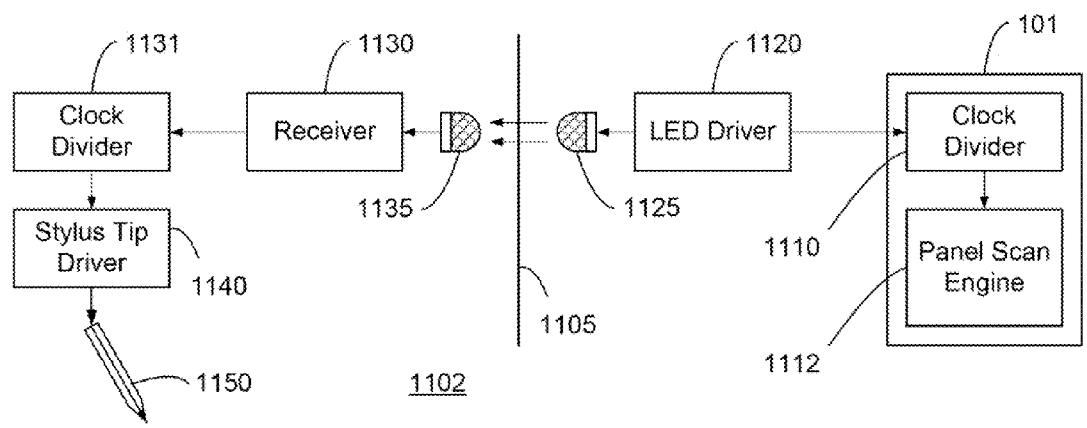

FIG. 11B illustrates an embodiment 1102 wherein the synchronization signal is generated by LED driver 1120 and sent to capacitance sensor 101. The synchronization signal may be divided down by clock divider 1111 and passed to panel scan engine 1112 to produce the TX drive signal. LED driver 1120 may be coupled to IR LED 1125 and configured to transmit the touchscreen clock information to the stylus 1150 through the overlay 1105, which is analogous to overlay 860 from FIGS. 8, 9A, 9B and 10. Touchscreen clock information or synchronization information is received by photodiode 1135 and demodulated by receiver 1130. Clock divider 1131 may be coupled between receiver 1130 and stylus tip driver 1140. In one embodiment clock divider 1131 may have the same dividing coefficient as clock divider 1111, which may enable an efficient translation of the clock signal or synchronization signal from LED driver 1120.

Figure 11C:
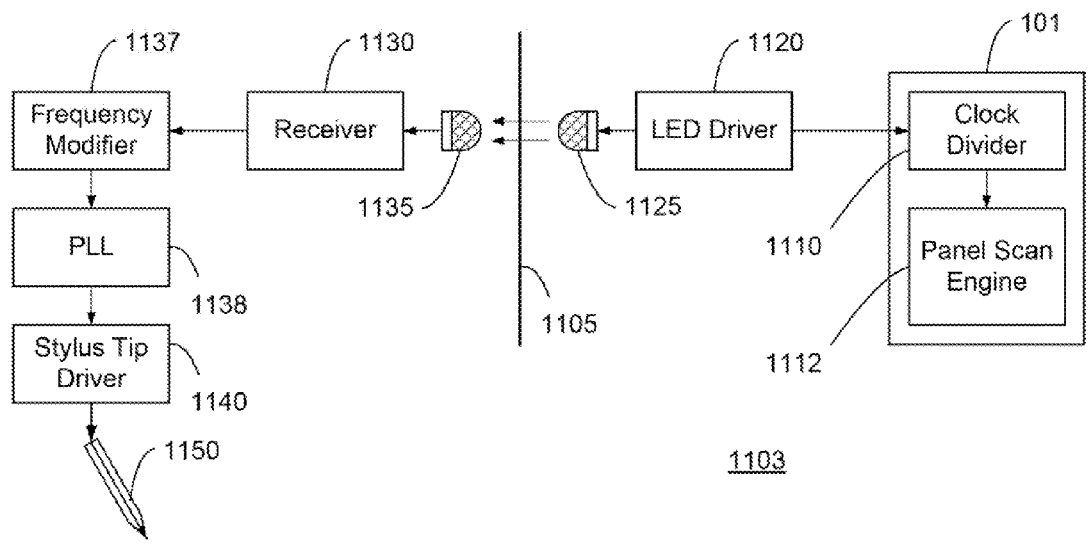

FIG. 11C illustrates an embodiment 1103 wherein the synchronization signal is generated by LED driver 1120 and sent to capacitance sensor 101. The synchronization signal may be divided down by clock divider 1111 and passed to panel scan engine 1112 to produce the TX drive signal. LED driver 1120 may be coupled to IR LED 1125 and configured to transmit the touchscreen clock information to the stylus 1150 through the overlay 1105, which is analogous to overlay 860 from FIGS. 8, 9A, 9B and 10. Touchscreen clock information or synchronization information is received by photodiode 1135 and demodulated by receiver 1130. Frequency modifier may be coupled to the output of receiver 1130 and the input of a phase lock loop (PLL) 1138. PLL may comprise a detector configured to receive the input from receiver 1130 and measure the phase of the input and a frequency relative to a feedback signal. The measurement signals received on PLL 1138 may be sent to a voltage controlled oscillator or charge pump (not shown) and may change the output frequency which may be routed back to the input. The feedback circuit of the PLL may be repeated until a desired output frequency from PLL is achieved nd passed to the stylus tip driver. Frequency modifier 1137 may comprise a single DFF and a chained DFF pair. In this embodiment, the frequency output may be divided by two and four as well as pass the native frequency. Frequency modifier 1137 may allow for higher synchronization signal processing without altering the voltage controlled oscillator or charge pump. In another embodiment, frequency modifier may comprise a inverter and buffer which are applied to the signal from receiver 1130. The output of the inverter and buffer may be received by PLL 1138 and recognized as a different frequency. In another embodiment, frequency modifier may comprise a series of chained buffers. In this embodiment, the buffers may be selected by the stylus tip driver of other circuit to create multiple frequencies depending on their combination.

Figure 11D:
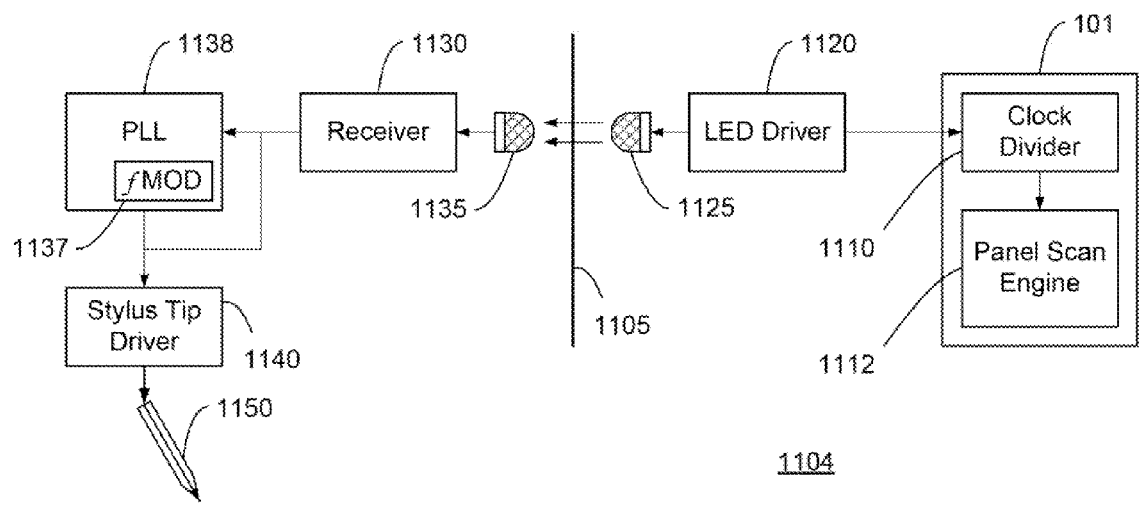

FIG. 11D illustrates an embodiment where in frequency modifier 1137 is integrated into PLL 1138.

Figure 12A:
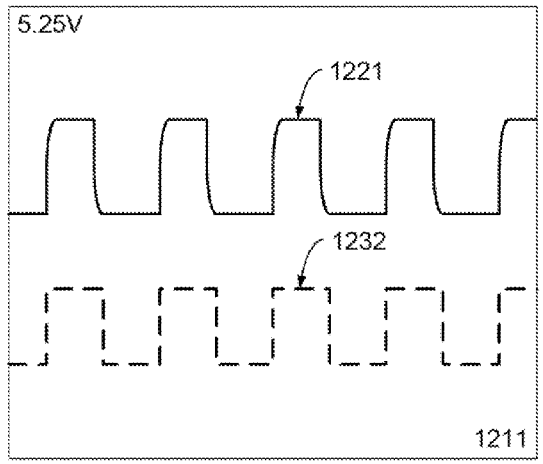
FIG. 12A-C illustrate example synchronization waveform and signal strength at various supply voltages.
Figure 12B:
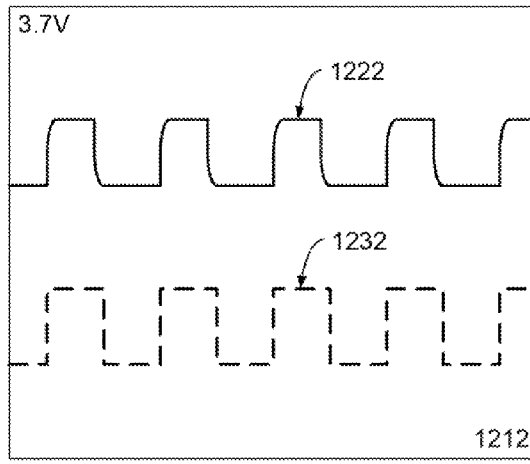
Figure 12C:
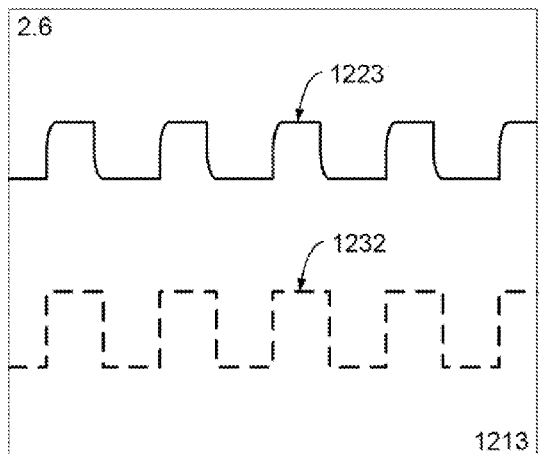
Figure 12D:
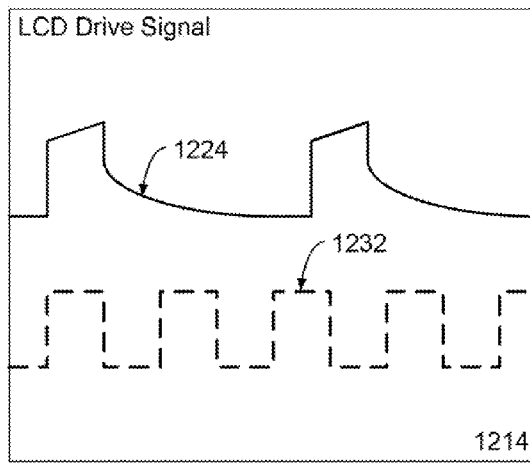
FIG. 12D illustrates an example LCD drive signal waveform.

FIGS. 12A-D illustrate representations of the synchronization light signals from the IR LED and the LCD backlight LED. FIGS. 12A-C illustrate the synchronization signals 1221, 1222 and 1223 based on clock frequency 1232. While some signal is absorbed by the stackup, enough signal survives to be received by the IR photodiode. FIG. 12D illustrates a representation 1214 of the LCD drive signal 1224. The LCD drive frequency may be much lower than the synchronization frequency and easily filtered by a simple high-pass filter. The amplitude of the LCD drive signal is also fairly low and incapable of saturating the photodiode.

Figure 13:
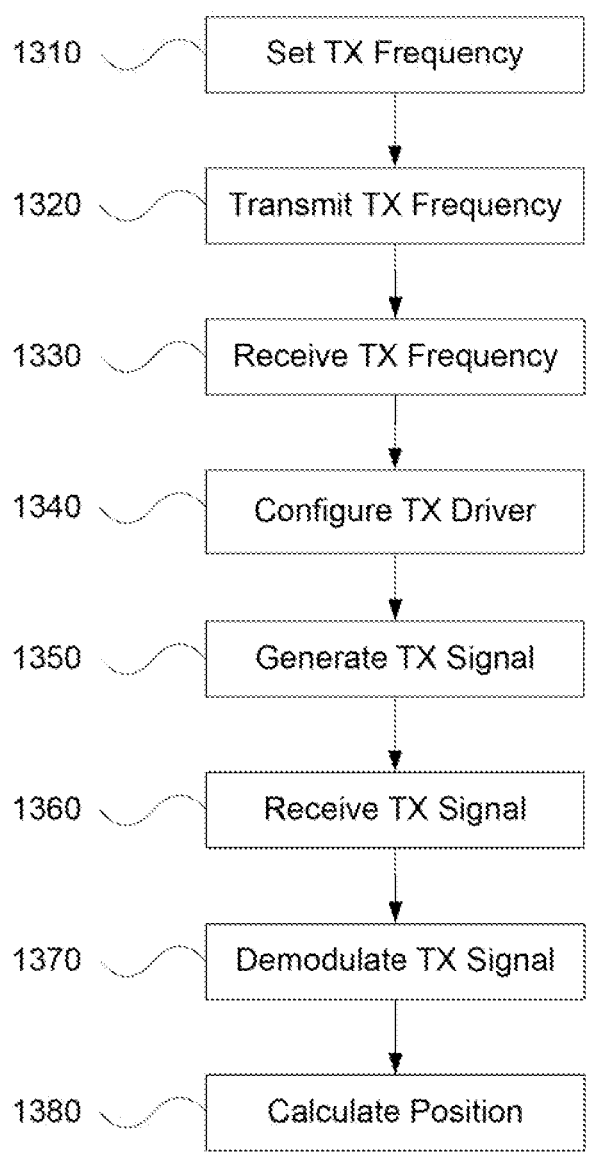
FIG. 13 illustrates an embodiment of a method optically synchronizing a stylus in a capacitive sensing system.

FIG. 13 illustrates an embodiment of a method 1300 for synchronizing the stylus drive signal to the receive demodulation circuit shown in FIG. 7. The TX frequency is first set in block 1310. The TX frequency may then be transmitted by the LED driver in block 1320. The TX frequency may be received and demodulated by the receiver in block 1330. The TX driver may then be configured according to the synchronization clock frequency in block 1340. TX driver may transmit the TX signal to the capacitance sensing array in block 1350. Capacitance sensing array 1360 may receive the TX signal from the stylus on the receive electrodes (illustrated in FIG. 1-4). Capacitance sensor (101 from FIG. 1) may demodulate the signal from the capacitance sensing array in block 1370 and calculate the position of the stylus on the capacitance sensing array based on the demodulated signal in block 1380.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A user input device comprising:
a display;
a capacitance sensor array disposed in a stackup with the display;
a capacitance sensor circuit coupled to the capacitance sensor array; and
an optical transmit (TX) circuit coupled to the capacitance sensor circuit, wherein the optical TX circuit is configured to receive a first signal from the capacitance sensor circuit and to transmit the first signal via light passing through the capacitance sensor array to an optical receiver included in a stylus, wherein the capacitance sensor circuit is configured to measure a capacitance using a second signal generated responsive to the first signal, and wherein the second signal is received by the capacitance sensor array.

2. The user input device of claim 1, wherein the capacitance sensor array and the capacitance sensor circuit are configured to measure mutual capacitance.

3. The user input device of claim 1, wherein the capacitance sensor array comprises a plurality of row and column electrodes and wherein the plurality of row and column electrodes are constructed from a transparent conductive material.

4. The user input device of claim 1, wherein the optical TX circuit comprises an IR LED coupled to an optical transmitter to transmit the first signal.

5. The user input device of claim 4, wherein the capacitance sensor comprises:
  a clock;
  a clock divider coupled to the clock; and
  a panel scan engine coupled to the clock divider, wherein the clock is configured to supply the first signal as a synchronization signal to the optical TX circuit and wherein the panel scan engine is configured to measure capacitance on the capacitance sensor array.

6. The user input device of claim 4, wherein the IR LED is disposed proximate to a display backlight diffuser and configured to transmit the first signal as an optical signal into the display backlight diffuser and to the stylus.

7. The user input device of claim 1, wherein the optical transmit circuit is configured to receive a plurality of signals from the capacitance sensor circuit and to transmit the plurality of signals optically to the optical receiver.

8. A stylus comprising:
  an optical receive (RX) circuit configured to receive an optical signal transmitted through a capacitance sensor array,
  a tip driver coupled with the optical RX circuit and configured to generate a transmit signal based on the received optical signal, and
  a conductive tip, wherein the tip driver is further configured to apply the transmit signal to the conductive tip to transmit the transmit signal to a capacitance sensor circuit through the capacitance sensor array.

9. The stylus of claim 8, wherein the optical RX circuit comprises a light tube, a photodiode, and an optical receiver.

10. The stylus of claim 8, wherein the optical RX circuit further comprises a clock divider coupled between an optical receiver and the tip driver, wherein the clock divider is configured to divide down the optical signal to match a clock signal for the capacitance sensor circuit.

11. The stylus of claim 8, wherein the optical RX circuit further comprises:
  a frequency modifier; and
  a phase locked loop (PLL), wherein the frequency modifier and the PLL are coupled between an optical receiver and the tip driver and are configured to match the transmit signal to a desired signal.

12. The stylus of claim 11, wherein the frequency modifier is a subsection of the PLL and wherein the PLL is coupled to the optical receiver and the tip driver.

13. A method comprising:
  receiving at a stylus tip of a stylus an optical signal passing through a capacitance sensor array;
  generating a transmit signal based on the received optical signal; and
  transmitting the transmit signal from the stylus tip to a capacitance sensor via the capacitance sensor array to be used in a capacitance measurement.

14. The method of claim 13, wherein receiving the optical signal comprises receiving a synchronization signal from an IR LED, the IR LED disposed proximate to a backlight diffuser of a display associated with the capacitance sensor.

15. The method of claim 13, wherein the optical signal is generated based on a clock signal.

16. The method of claim 15, wherein the clock signal is generated by the capacitance sensor, the capacitance sensor configured to measure capacitance between the stylus and a plurality of receive electrodes of the capacitance sensor array.

17. A method comprising:
  transmitting an optical signal through a capacitance sensor array to a stylus, wherein the optical signal is configured to synchronize the stylus with a sensing device;
  receiving at the capacitance sensor array a transmit signal from the stylus, wherein the transmit signal is modulated based on a modulation of the optical signal;
  demodulating the transmit signal to measure a capacitance; and
  calculating a position of the stylus based on the measured capacitance.

18. The method of claim 17 wherein demodulating the transmit signal yields a mutual capacitance for a mutual capacitance between the stylus and a plurality of receive electrodes of the capacitance sensor array.

19. The method of claim 17 wherein the optical signal provides synchronization between the stylus and a circuit configured to demodulate the transmit signal.

20. The method of claim 17, wherein the optical signal provides synchronization information on a sensing circuit to the stylus.

* * * * *